United States Patent [19]

Kaigler, Jr., deceased et al.

[11] 4,128,219
[45] Dec. 5, 1978

[54] ABOVEGROUND SLIDING SUPPORT ASSEMBLY FOR A PIPELINE

[75] Inventors: Noyle B. Kaigler, Jr., deceased, late of Baytown, Tex., by Mary A. Kaigler, executrix, Gloster, Miss.; Spence L. Hochstein; James A. Maple, both of Anchorage, Ak.

[73] Assignee: Exxon Production Research Company

[21] Appl. No.: 686,882

[22] Filed: May 17, 1976

[51] Int. Cl.² .............................................. F16L 3/16
[52] U.S. Cl. ....................................... 248/55; 248/49
[58] Field of Search .................. 248/49, 55, 70, 54 R, 248/371, 394, 396, 180, 346, 122, 188.5; 61/105; 138/106

[56] References Cited

U.S. PATENT DOCUMENTS

| 827,575 | 7/1906 | Smead | 248/346 X |
|---|---|---|---|
| 1,240,521 | 9/1917 | Wendland | 248/54 R |
| 1,470,529 | 10/1923 | Gerber | 248/49 |
| 2,738,151 | 3/1956 | Herzog | 248/55 |
| 3,237,867 | 3/1966 | Hogg | 138/106 X |
| 3,298,644 | 1/1967 | Sherburne | 248/55 |
| 3,390,854 | 7/1968 | Sherburne | 248/55 |
| 3,888,439 | 6/1975 | Tuttle | 248/54 R |

FOREIGN PATENT DOCUMENTS

| 21147 of | 1892 | United Kingdom | 248/396 |
|---|---|---|---|
| 25036 of | 1903 | United Kingdom | 248/49 |

Primary Examiner—Rodney H. Bonck

Attorney, Agent, or Firm—Christensen, O'Connor, Johnson & Kindness

[57] ABSTRACT

The support assembly is constructed so that an aboveground pipeline resting thereon can move longitudinally and laterally relative to the path of the pipeline to allow for normal thermal contraction and expansion in the pipeline. The support assembly is also designed for earthquake contingencies to prevent damage to the pipeline and to the support assembly upon occurrence of relative movement between the pipeline and the support assembly that is greater than that encountered with normal thermally motivated movement. The support assembly includes a pair of vertical support members spaced transversely at a given location along the path of the pipeline, which vertical support members are interconnected by a transversely oriented cross member. The cross member is adjustable relative to the vertical support members to orient it horizontally and is further adjustable to accommodate tolerance variations that occur during the fabrication and construction of the components of the assembly. A sliding shoe rides on the horizontal upper surface of the cross beam. The shoe has two pairs of stanchions pivotally connected respectively to two clamps that wrap about the pipeline. The stanchions have provision for adjusting the height of the pivotal connection relative to the base of the shoe so that the pipeline can be elevated or lowered relative to the cross member, primarily to compensate for variances in the nominal pipeline elevation.

7 Claims, 13 Drawing Figures

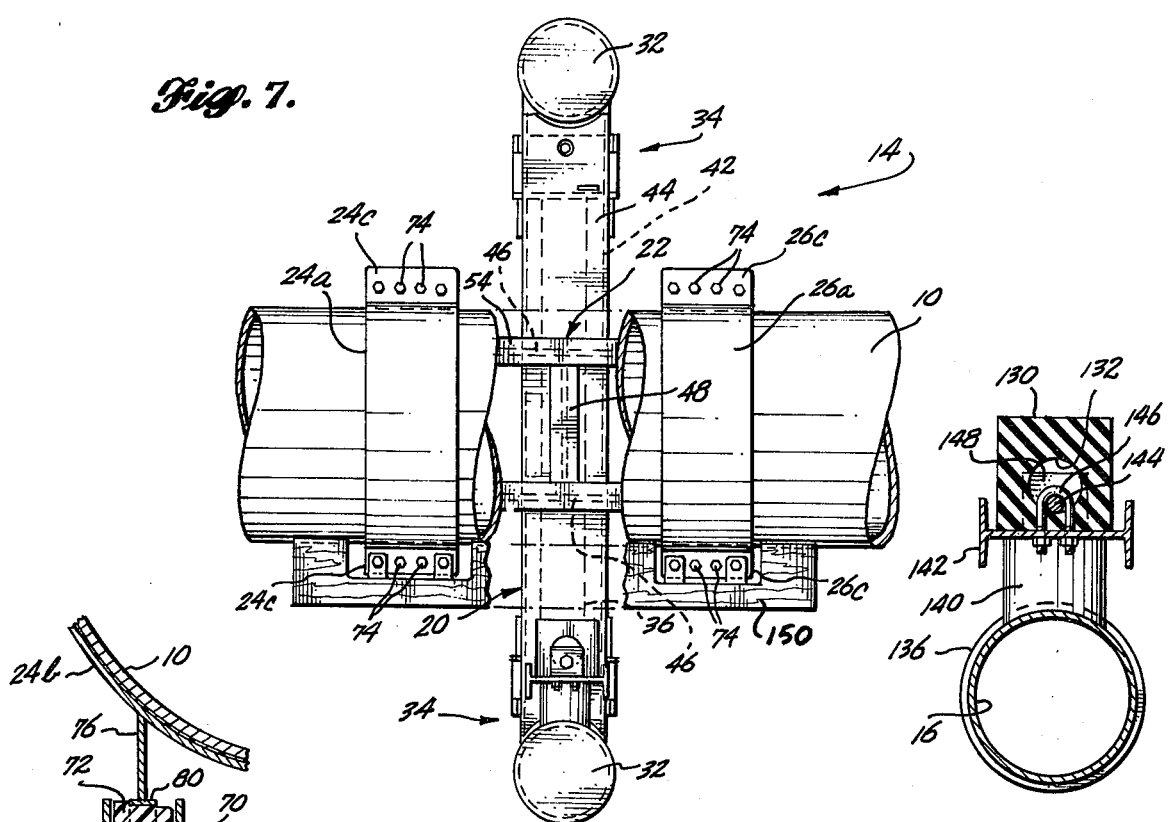
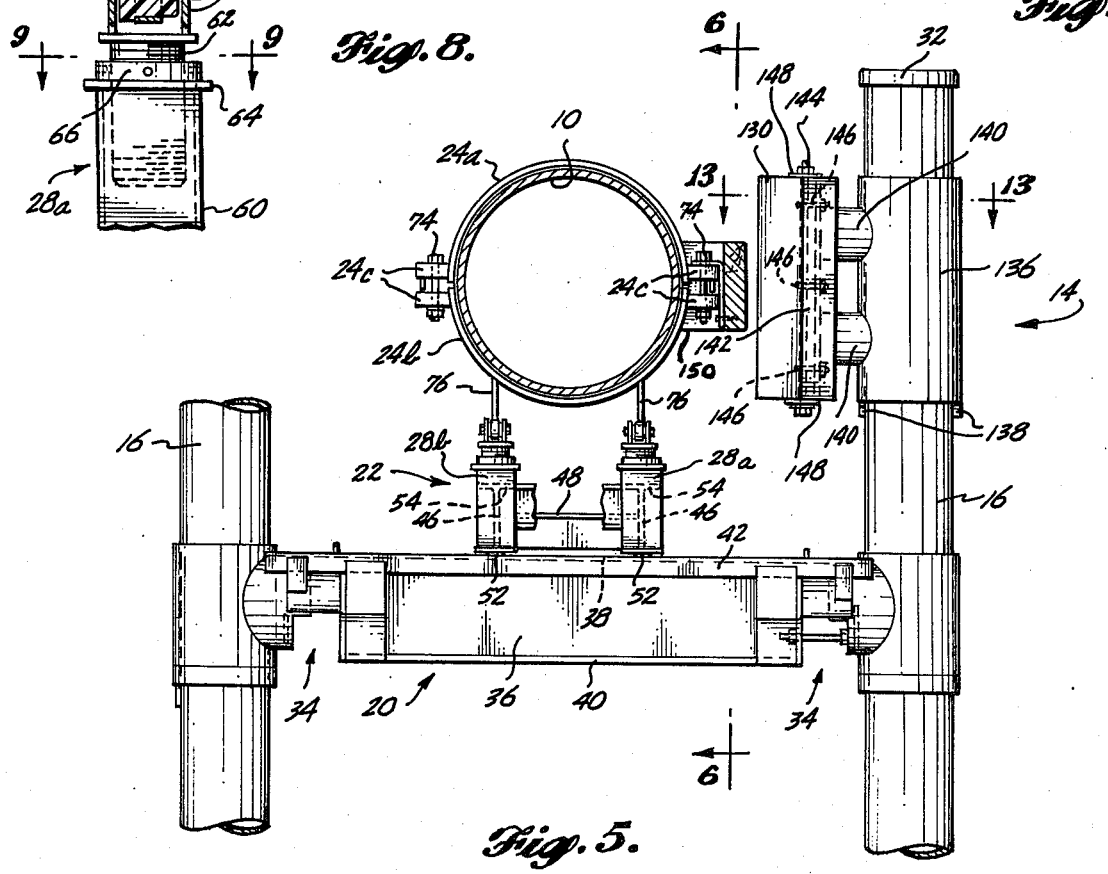

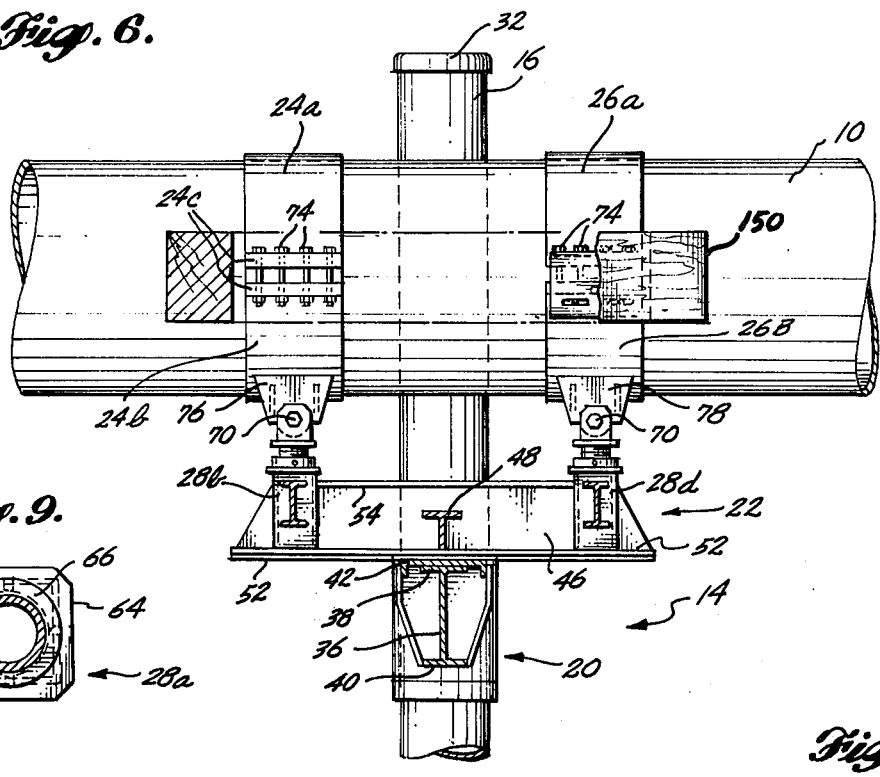
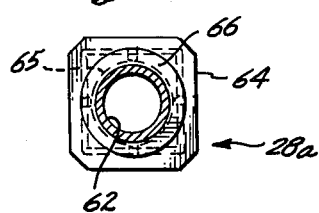
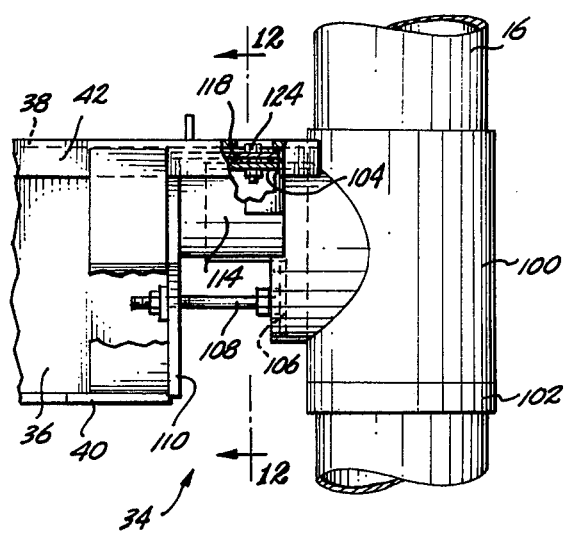
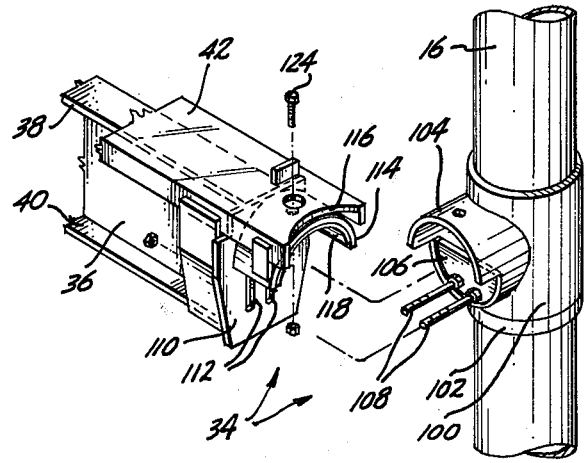
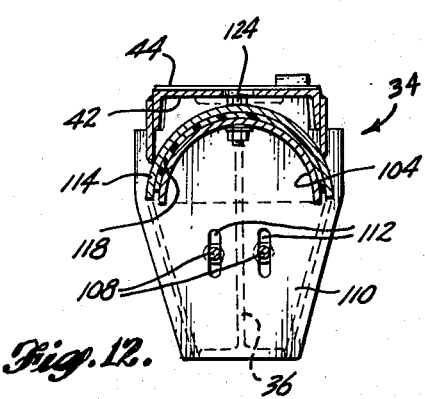

ABOVEGROUND SLIDING SUPPORT ASSEMBLY FOR A PIPELINE

BACKGROUND OF THE INVENTION

The present invention relates to support assemblies for aboveground or elevated pipelines, and more particularly, to support assemblies that allow relative movement between the pipeline and the ground to provide for normal thermal expansion and contraction in the pipeline and apparatus for preventing substantial damage to the pipeline and the support assembly upon occurrence of large, relative movements between the pipeline and the support assembly caused by seismic disturbances.

The most economical means for transporting crude oil or other petroleum products through Arctic regions is a pipeline. Normally such pipelines are subterranean, that is they are installed in back filled trenches that interconnect one or more pumping stations between a well and a shipping terminal or refinery. Through certain Arctic regions, however, a subterranean pipeline is not feasible as the permafrost that constitutes the soil will, under certain temperature conditions, melt and not provide support for the buried pipeline, thus allowing the pipeline to more or sag within the ground and potentially causing damage to the pipeline. The solution to this problem has been to place portions of the pipeline above the ground in Arctic regions.

Not only are pipelines generally not supported above the ground because of the additional cost involved in constructing an elevated pipeline, but Arctic conditions, especially those that exist between the North Slope in Alaska and the Southern coast of Alaska, present problems that have heretofore been unencountered in the construction of a pipeline. First of all, the support members or pilings must generally be oriented perpendicularly to the ground plane, that is vertically, so as to achieve maximum strength with minimum structure and cost. The topography over which the pipeline traverses dictates that the pipeline at any given location of a vertical support member will not always be oriented at the same angle relative to the support as at the previous or the succeeding support location. Thus, aboveground support assemblies for an elevated pipeline must have the capability of interconnecting vertical support members with a pipeline oriented at various angles to the support members.

The aboveground support assemblies must also be designed to allow for various fabrication and construction tolerances including height and spacing of the vertical support members and variations in the nominal elevation and angulation of the pipeline relative to the vertical support members. Thus provision must be made in designing the support assemblies to allow for the tolerance variations by providing adjustable interconnections between the vertical support members and any transverse interconnecting members and to provide for elevation-adjustable connections between the pipeline and the support assemblies to allow for elevation and angulation variances in the pipeline relative to the support assembly.

Provision must also be made in the aboveground support assemblies to allow for thermal contraction and expansion of the pipeline responsive to transient internal temperature changes and transient and seasonal ambient temperature variations. Although the pipeline must be rigidly affixed to the ground at spaced locations along the path of the pipeline, provision must be made at intermediate locations for longitudinal and lateral movement of the pipeline relative to the support assembly.

Moreover, in many Arctic areas, pipeline must traverse regions in which ground faults are present. Should a seismic disturbance occur, the disturbance could easily cause a shift in the ground and thus the pipeline support structures over a portion of the pipeline route. This in turn could cause the pipeline support structures for a portion of the pipeline to shift a substantial distance relative to adjacent support structures. Therefore, provision must be made in the support assemblies to allow for such movements and to prevent damage to the assemblies and the pipeline. If thermal expansion supports of the sliding type are to be employed, provision must be made to protect the pipeline and the support assemblies should the sliding connections between the pipeline and the support assembly become disengaged.

SUMMARY OF THE INVENTION

Therefore, in accordance with the foregoing objectives, and in accordance with other objectives that will become apparent to one of ordinary skill in the pipeline construction art upon reading the following specification, the present invention provides an adjustable sliding support for an elevated pipeline including a support cross member and means for mounting the member above the ground in stationary relationship thereto and a shoe mounted in sliding relationship on the cross member that has height adjustable means for connecting the shoe to the pipeline. The cross member preferably has a generally horizontal upper surface oriented transversely to the path of the pipeline. The base member of the sliding shoe has a bottom surface oriented in substantially parallel relationship to the upper surface of the cross member and is mounted on the upper surface of the cross member to slide in both the longitudinal and lateral directions relative to the path of the pipeline, thereby providing a sliding support to allow the pipeline to move in both directions when occasioned by normal thermal contraction or expansion of the pipeline. Preferably, a friction reducing member is interposed between the bottom surface of the shoe and the upper surface of the cross member to reduce the frictional resistance to such movement.

In another aspect of the invention, means are provided on the shoe to allow the shoe to drop away from its interconnection with the pipeline should the pipeline move sufficiently relative to the vertical support and cross members to disengage the shoe from the cross member. In the preferred embodiment the pipe is supported over the shoe by a bar pivotally mounted to pipe clamps wrapped about the pipe. The bar is reciprocally inserted in an upright tubular member affixed to the sliding shoe. The height adjustable means associated with the bar and tubular member holds the bar in a predetermined height relationship with the tubular member when the shoe is resting on the supporting cross member, but allows free downward movement of the shoe and tubular members under the influence of gravity when the shoe becomes disengaged from the cross member.

In still another aspect of the present invention, an improved means for adjustably connecting a cross member to an upright, preferably vertical, ground engaging support member is provided. The improved connecting means includes a sleeve-like member so constructed and oriented on the upright support member so as to be upwardly and downwardly movable on and swingable about the support member and further includes means for fixing the sleeve at a predetermined height on the support member. A first arcuate member is affixed to the sleeve and extends in its longitudinal dimension toward an end of the cross beam with its convex surface portion facing upwardly. A second or mating arcuate member is affixed to the adjacent end of the cross member and extends longitudinally toward the sleeve with its concave surface portion facing downwardly. The two arcuate members are constructed and oriented relative to each other so that the convex surface portion can supportively engage the concave surface portion to provide for rotation of the cross member about an axis parallel to its longitudinal dimension, i.e. about an axis oriented transversely to the path of the pipeline. This feature, in conjunction with the height adjustability of the sleeve-like member, allows the cross member to be horizontally oriented during construction. Moreover, the mating relationship of the arcuate members allows the cross member to be adjusted in a direction parallel to its longitudinal dimension to center the cross member between the upright support members. Additionally, the sleeve-like member is rotatable about the upright support member to provide the capability to adjust for slight misalignments of the upright support members from their nominal location along a line orthogonal to the pipeline path.

BRIEF DESCRIPTION OF THE DRAWINGS

A better understanding of the present invention can be derived by reading the ensuing specification in conjunction with the accompanying drawings wherein:

FIG. 5 is a cross sectional view through the pipeline showing the intermediate support assembly in elevation;

FIG. 6 is a sectional view in elevation taken along section line 6—6 of FIG. 5;

FIG. 7 is a plan view of the intermediate support assembly with a portion of the pipeline overlying the assembly broken away;

FIG. 8 is a greatly enlarged elevation view in partial cross section of one of the upright members on the sliding shoe that forms part of the support assembly of the present invention;

FIG. 9 is a cross-sectional view taken along section line 9—9 of FIG. 8;

FIG. 10 is an enlarged isometric view partially exploded, detailing the interconnection between a horizontal cross member and a vertical support member forming part of the intermediate support assembly of the present invention;

FIG. 11 is an enlarged, side elevation view in partial section and partially broken away showing the cross member connected to the vertical support member;

FIG. 12 is a cross sectional view taken along section line 12—12 of FIG. 11; and FIG. 13 is a cross-sectional view through a vertical support member and a bumper taken along section line 13—13 of FIG. 5.

DETAILED DESCRIPTION

Figure 4:
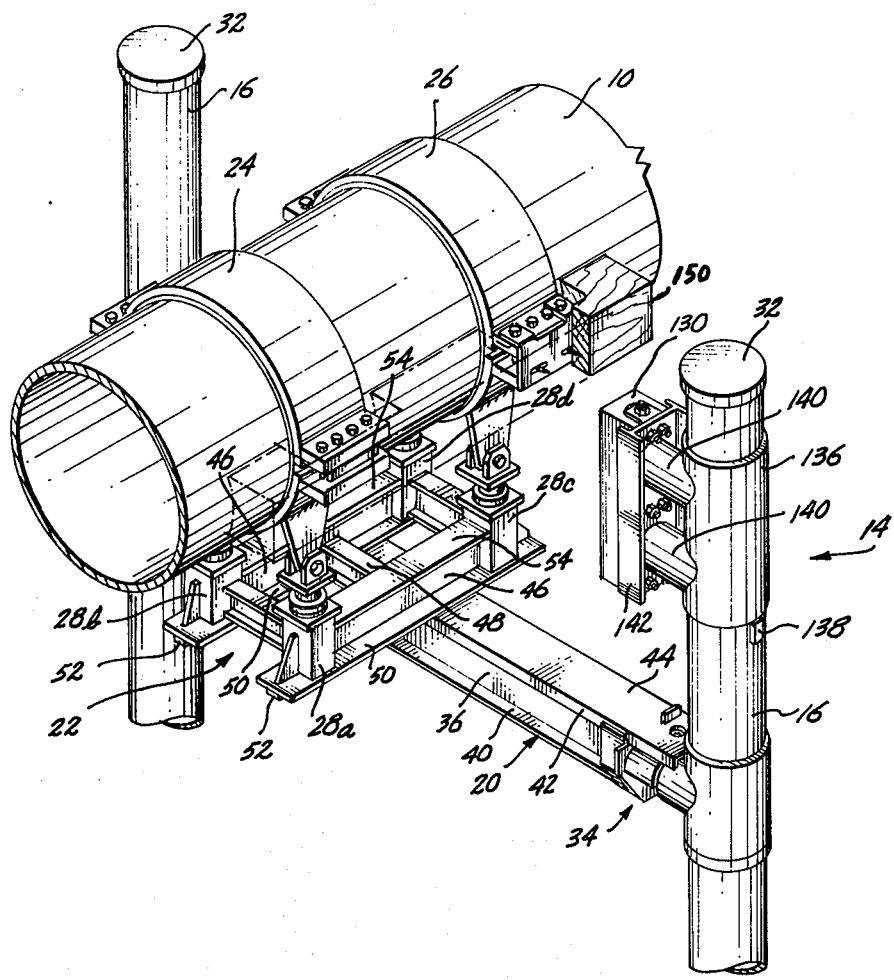
FIG. 4 is a detailed, isometric view of the intermediate support assembly shown in FIG. 2.
Figure 1:
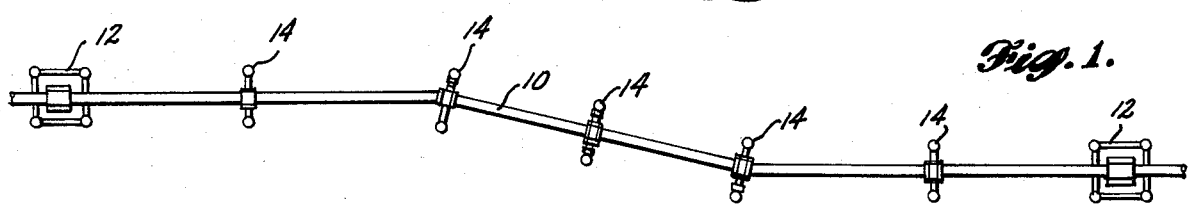
FIG. 1 is a simplified plan view of a portion of a pipeline showing a pair of anchor supports at spaced locations along the pipeline with a plurality of intermediate, sliding support assemblies of the present invention spaced between the anchor supports.

Aboveground pipelines are constructed so that in plan view a repetitive zig-zag configuration is formed. Other configurations can also be employed as necessary. As shown in FIG. 1, a single zig-zag section of pipeline 10 is strung between and supported above the ground by two anchor supports 12 and a plurality of intermediate support assemblies 14 positioned at spaced locations between the anchor supports. The pipeline is constructed in repetitive zig-zag segments to allow the pipeline to expand and contract under transient and seasonal ambient temperature changes, as well as to allow for seismic disturbances that may cause one or more of the anchor support assemblies or intermediate support assemblies to shift relative to the pipeline. The anchor support assemblies, normally spaced from about 900 to 1800 feet apart, releasably fix the pipeline to the ground so that the pipeline will not move relative to the anchor support under normal conditions, including normal thermal contraction and expansion. These anchor support assemblies are described in greater detail in the commonly owned copending patent application, Ser. No. 688,304, filed May 20, 1976, incorporated expressly herein by reference.

Figure 2:
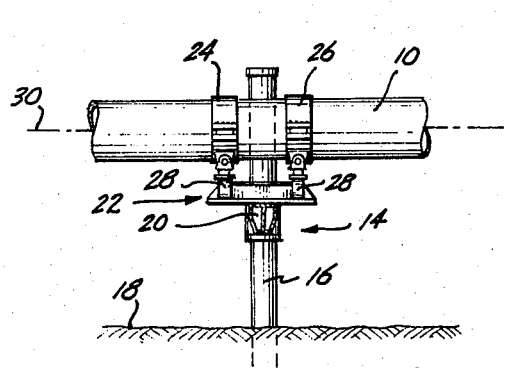
FIG. 2 is a side elevation view in partial cross section of a sliding intermediate support assembly of the present invention showing the pipeline oriented horizontally.

The intermediate supports of the present invention are constructed so as to allow the pipeline to move freely in both the longitudinal direction, i.e. along the general direction of the path of the pipeline, and in the transverse direction, i.e. laterally to the path of the pipeline. Referring to FIG. 2, the intermediate support assemblies include at least one upright support member 16 such as a piling that is securely and rigidly set in the ground 18 to provide a stationary base upon which the remainder of the intermediate support is constructed. Each of the intermediate support assemblies preferably employs two of the upright support members that are transversely spaced on opposite sides of the pipeline 10 and that are preferably vertically oriented, i.e. perpendicular to the plane of the horizon. These upright support members will hereafter be referred to as the vertical support members 16. A cross member 20 is affixed to the vertical support member 16 at a predetermined elevation above the ground. Under certain conditions it may be desirable to omit the vertical support member 16 and set the cross member 20 directly on the ground. A sliding shoe 22 having its bottom surface oriented parallel to the upper surface of the cross member 20 is positioned to slide on the upper surface of the cross member 20 and to move longitudinally along the path of the pipeline 10 and also to move transversely to that path responsive to thermal contraction and expansion of the pipeline 10. A pair of pipe clamps 24 and 26 spaced longitudinally along the pipeline are fastened to upright members 28 on the sliding shoe 22 to support the pipeline 10 on the intermediate support.

Figure 3:
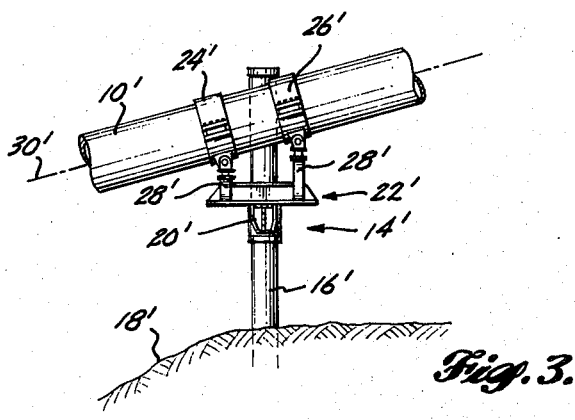
FIG. 3 is a side elevation view in partial cross section similar to FIG. 2 showing the pipeline oriented at an angle to the horizontal.

The upper surface of the cross member 20 is planar and is preferably horizontally oriented i.e., parallel to the plane of the horizon. Likewise, the bottom surface of the sliding shoe, being parallel to the upper surface of the cross member 20, is also horizontally oriented. When the nominal or design path of the pipeline 10, as represented by the pipe center line 30, is also horizontal, the upright members 28 on the shoe 22 are of substantially equal length, thus rising the same distance above the bottom surface of the shoe and being connected to identical clamps 24 and 26 on the pipeline 10. When the nominal path of the pipeline is oriented at an angle to the horizontal, as represented by the pipe center line 30' in FIG. 3, the upright members 28' on the shoe 22' are of unequal length and are sized to compensate for the difference in elevation between the connecting locations on the two longitudinally spaced clamps 24' and 26' on the pipeline 10. In either event, whether the pipeline is horizontal or oriented at an angle to the horizontal, the clamps 24' and 26' are identical. The angular orientation or slope of the pipeline is dictated by the topography underlying the path of the pipeline. Thus as shown in FIG. 3, the ground 18' at any location may be sloping over a relatively long distance, thus requiring the pipeline to traverse at an angle to the horizontal. When an intermediate support 14' is positioned at a location where the pipe center line 30' is sloping, the upright support members 16' are still preferably vertically oriented while the upper surface of the cross member 20' and the lower surface of the shoe 22' are preferably horizontally oriented.

Referring now to FIGS. 4, 5, 6 and 7, the preferred embodiment of the intermediate sliding support will be described in sufficient detail so that one of ordinary skill in the art can make and use the assembly. Two vertical support members 16 are positioned in the ground as pilings and extend above ground level sufficiently high so that the upper ends reside above the nominal elevation of the pipeline 10. The vertical support members 16 are generally tubular in construction and have their exposed upper ends capped by covers 32. If the vertical support members 16 are to be placed in soil such as permafrost, steps can be taken either to refrigerate the lower ends of the vertical support members and/or to position lateral projections or corrugations on the vertical support members below ground level to insure that they will remain stable during cyclic freezing and thawing of the permafrost. The cross member 20 spans the transverse space between the vertical support members 16. Connecting assemblies 34 join the opposite ends of the cross member 20 to the respectively adjacent vertical support members 16. The connecting assemblies 34 will be described in greater detail below in conjunction with FIGS. 10, 11 and 12.

The cross member 20 in its preferred form comprises an I beam 36 having its web vertically oriented and having upper and lower flanges 38 and 40, respectively. A channel beam 42 having a web width greater than the upper flange width on the I beam 36 is positioned so that the inner surface of the web of the channel beam 42 contacts and is fastened by conventional means, such as welding, to the upper surface of the upper flange 38 of the I beam 36. The channel beam 42 spans the entire distance between the vertical support members 16 and terminates immediately adjacent but not contiguous with the vertical support members 16. Each end of the I beam 36 terminates at a location spaced somewhat inwardly from the end of the channel beam 42 to provide space for the connecting assemblies 34. The upper surface of the web of the channel beam 42 forms the upper surface of the cross member 20 upon which the shoe 22 rests in sliding relationship. As can be seen in conjunction with FIG. 12, a thin layer 44 of friction reducing material is laminated onto the upper surface of the web of the channel beam 42 to reduce the frictional resistance to movement of the shoe 22 thereover. The upper surface of the web of the channel beam 42 is oriented horizontally during construction by means explained below so that the shoe 22 when sliding over the upper surface of the channel beam 42 will not encounter any resistance to movement other than that attributable to friction forces between the intimately contacting surfaces of the shoe 22 and the channel beam 42.

The base of the shoe 22 is constructed from two I beams 46 that are normally oriented longitudinally relative to the path of the pipeline and the transverse cross member 20. The base I beams 46 and 48 are spaced in the transverse direction by about one third to one fourth the distance between the vertical support members 16. The central portions of the webs of the base I beams 46 are joined by a T beam 48 having a web about half the height of the web of the base I beams 46 and having a horizontal flange on the upper end thereof positioned about halfway up the height of the web of the base I beams 46. The bottom flanges 50 and 52 of the base I beams have longitudinal extensions that protrude outwardly beyond the upper flanges 54 and the webs at opposite ends of the base I beams 46. A strip 52 of friction reducing material is laminated to the bottom flanges 50 of each of the base I beams 46 for contacting the friction reducing layer 44 on the top of channel beam 42 to further reduce the sliding friction between the contact surfaces of the cross member 20 and the shoe 22.

The upright members 28a and 28b to which the pipe clamps 24 and 26 are fastened are positioned on each of these four extensions on the base I beams 46 and, when viewed from above, are located in a rectangular array with the transverse spacing being slightly less than the longitudinal spacing. All of the upright members, hereafter referred to as stanchions 28a, 28b, 28c and 28d, are constructed substantially identically so that a description of one stanchion 28a will suffice to describe the construction and use of all the stanchions 28a through 28d. Referring to the enlarged views of FIGS. 8 and 9, the stanchion 28a includes a lower, tubular portion 60 and an upper bar or rod 62 mounted on the tubular portion 60 for reciprocal movement in upward and downward directions. The lower tubular portion 60 is substantially square in cross section in the preferred embodiment but can be circular or any other suitable configuration without departing from its intended purpose. The lower end of the tubular portion 60 rests on and is fixed to the upper surface of the extension of the lower flange 52 of the longitudinal base I beam 46 (FIG. 6) while the ends of the web and upper flange 54 of the base I beam 46 abut and are affixed to the adjacent side of the stanchion 28a. The upper end of the lower tubular portion 60 carries a horizontal retainer plate 64 having a peripheral dimension slightly greater than the peripheral dimension of the tubular member 60. The retainer plate has a central bore 65 having a diameter less than the internal dimensions of the tubular member 60 into which the lower end of the reciprocable bar 62 is inserted. This bore 65 can be elongated in the longitudinal direction of the pipeline if desired, to accommodate slight transverse bends in the pipeline and thus alleviate small misalignment problems that may occur. The bar 62 is preferably circular in cross section and has its lower portion threaded to receive an adjustment nut 66. The lower surface of the nut 66 rests on the upper surface of the retainer plate 64 to position the bar 62 at a predetermined height dependent upon the vertical location of the adjustment nut 66 on the threaded, lower portion of the bar 62. The upper end of the bar 62 carries an upwardly extending yoke 68 having two spaced flanges with mutually aligned, horizontally oriented bores for receiving a suitable fastener such as bolt 70. A bearing sleeve 72 is positioned in the yoke and has a central bore sized to receive the central portion of the bolt 70 when inserted through the mutually aligned bores in the yoke 68. The sleeve 72 can rotate about the bolt 70 to provide a pivotal connection for the pipe clamps 24 and 26 (FIGS. 4 through 7) to the shoe 22.

Referring to FIGS. 4 through 7, each of the pipe clamps 24 and 26 comprise upper and lower semi annular members 24a and 24b and 26a and 26b, respectively, having internal radiuses of curvature substantially the same as the external radius of the pipe 10. Each of the upper and lower halves of the pipe clamps have generally radially outwardly extending flanges 24c and 26c that, when installed on the pipe 10, are generally horizontally oriented and spaced in the vertical direction from each other. Mutually aligned bores in the clamp flanges 24c and 26c receive suitable fasteners such as bolts 74 to draw the mutually opposing upper and lower halves of the pipe clamps 24 and 26 together and thus secure them around the circumference of the pipe. The lower halves 24b and 26b of the pipe clamps each have two transversely spaced, downwardly extending flanges 76 and 78, respectively. The flanges 76 on the lower half 24b of the pipe clamp 24 are spaced by a distance equal to the transverse spacing of the stachions 28a and 28b on the sliding shoe 22. Referring to FIG. 8, an annular bushing 80 is affixed to the bottom end of each of the downwardly extending flanges 76 on the lower half 24b of the pipe clamp 24. The annular bushing 80 has its axis horizontally and transversely oriented and has its internal diameter sized to snugly but rotatably surround the periphery of the bearing sleeve 72. Each of the connections of the downwardly extending flanges 76 and 78 on the pipe clamps are similarly constructed and supplied with an annular bushing to complete the pivotal connection between the pipe clamps 24 and 26 and the stanchions 28a through 28d on the shoe 22.

The bearing sleeve 72 is composed of any suitable thermal and electrical insulating material that is capable of withstanding the loads exerted on the sleeve by the weight of the pipeline and by dynamic movement of the pipeline. A preferable material from which the bearing sleeve can be cast or machined is a polymeric composition such as a polyurethane. Of course, the exact composition of the polyurethane must be designed to provide the desired thermal insulating, electrical insulating and stress bearing qualities. The important function of the bearing sleeve 72 is to thermally isolate the sliding shoe and thus the cross member 20 and vertical support member 16 from the pipeline. As one of ordinary skill in the art is aware, fluids traveling through a pipeline, particularly petroleum products, may be at elevated temperatures. If the support assemblies and especially the vertical support members were not thermally isolated from the pipeline, much of the heat of the oil would be conducted through the support structure to the portion of the vertical support members embedded in the ground. When the vertical support members are embedded in permafrost, the heat conducted from the pipeline to the soil could cause the soil surrounding the vertical support members to thaw and thus destroy the capability of the soil to rigidly hold the vertical support member in its desired position.

If a major displacement of the pipeline 10 relative to the cross member 20 were to occur, the shoe 22 could become disengaged from the cross member. As this occurred, the weight of the pipe would cause the pipe to sag and lower the bottom of the shoe below the upper surface of the cross member 20, preventing reengagement of the supporting surfaces. Upon a relative shift of the pipeline and the cross member in the opposite direction, the shoe could contact the side of the cross beam 20 and could cause substantial damage. To prevent this occurrence the stanchions 28a through 28d are constructed to allow the shoe 22 to drop away from the pipeline should it become disengaged from the cross member 20. This feature of the invention is made possible by constructing the stanchions 28a through 28d so that the bars 62, while supporting the weight of the pipeline on the tubular members 60, can slide freely out of the tubular portions 60 of each of the stanchions when the support from under the shoe 22 is removed.

Referring now to FIGS. 10, 11 and 12, the interconnecting assembly 34 comprises a height adjustable sleeve 100 mounted on the vertical support member 16 and a mating member attached to an end of the cross member 20. As the interconnecting assemblies for fastening opposite ends of the cross member 20 to respectively adjacent vertical support members 16 are identical, only one of the interconnecting assemblies 34 need be described. The sleeve 100 is circular in cross section and has an inner diameter sized slightly larger than the outer diameter of the tubular vertical support member 16. The sleeve 100 is mounted for upward and downward sliding motion on the vertical support member 16. Sleeve 100 is held in a predetermined vertical position, dependent upon the nominal elevation of the pipeline above the ground, by a retaining ring 102. The retaining ring 102 is annularly shaped and has an inner diameter substantially the same as that of the sleeve 100. The sleeve is positioned at the appropriate height on the vertical support member 16 and the retaining ring 102 is slid upwardly on the vertical support member 16 to abut the bottom edge of the sleeve 100. Thereafter, the sleeve can be raised while holding the retaining ring at its original abutment position on the vertical support member so that the retaining ring 102 can be welded or otherwise suitably and permanently affixed to the vertical support member. An arcuate supporting member 104 is affixed to the outer surface of the sleeve 100 and extends radially outwardly therefrom. In the preferred embodiment, the arcuate supporting member 104 is a cylinder or tubular member having a longitudinal axis or axis of revolution that is oriented parallel to a radius of the sleeve 100. The cylindrical supporting member has an outward, semicylindrical extension on the upper portion thereof. A semicircular plate 106 is mounted within the lower portion of the cylindrical supporting member 104 and is oriented orthogonally to the axis of the cylinder. A pair of connecting bolts 108 are affixed to and extend perpendicularly outwardly from the semicircular plate 106 and under the semicylindrical extension, terminating at a location beyond the edge of the semicylindrical extension.

The mating portion of the interconnecting assembly 34 includes an end plate 110 affixed to the end of the cross beam 36 and oriented orthogonally to the web and flanges of the cross beam. A pair of vertical slots 112 in the end plate 110 positioned on each side of the web of the cross beam 36 are located to receive the ends of the bolts 108 mounted on the supporting member 104. A second arcuate mating member 114, in the preferred embodiment a hollow, semicylindrical member having a longitudinal axis or axis or revolution oriented orthogonally to the end plate 110, is affixed to the end plate above the slots 112 and extends outwardly toward the vertical support member 16. The inside diameter of the mating arcuate member 114 is slightly larger than the outside diameter of the supporting arcuate member 104 so that the concave inner surface of the mating arcuate member 114 can be positioned in supported relationship on top of the convex outer surface of the supporting arcuate member 104. In the preferred embodiment, the channel beam 42 forming part of the cross member 20 extends outwardly beyond the end of the cross beam 36 and over the mating arcuate member 114. The web of the channel beam 42 has an inwardly curving, arcuate recess 116 that provides adequate clearance between the end of the channel beam 42 and the outer surface of the sleeve 100 when the interconnecting assembly 34 is assembled.

In use, the height adjustable sleeve 100 of the interconnecting assembly 34 is first positioned at the appropriate location on the vertical support member 16 and thereafter the retaining ring 102 is affixed to the vertical support member 16. The same procedure is followed for the height adjustable sleeve on the opposite vertical support member. The sleeves can then be rotated about the vertical support members to align the longitudinal axes of the arcuate supporting members on each of the sleeves. Thereafter the cross member 20, including the mating portion of the interconnecting assemblies 34 connected to opposite ends thereof, is positioned so that the mating arcuate members 114 on each end of the cross member 20 are positioned in overlapping and supported relationship on the supporting arcuate members 104 on each of the height adjustable sleeves 100. Preferably, a layer 118 of resilient material capable of withstanding large compression loads is interposed between the respective convex and concave surfaces of the supporting and mating arcuate members 104 and 114. Thereafter the mating arcuate members 114 are allowed to rest on the supporting arcuate members 104 so that the bolts 108 extending outwardly from the arcuate member 104 engage and extend through the slots 112 in the end plate 110 on the cross member. The resilient layer can compensate for slight misalignments between arcuate members 104 and 114 caused by the axes thereof not being oriented exactly parallel. The cross beam then can be rotated about an axis parallel to its center line, i.e. about the longitudinal axes of the two arcuate members, until the upper surface of the channel beam 42 is oriented in a horizontal position. Thereafter, aligning apertures can be drilled through the web of the channel beam 42, through the mating arcuate member 114 and the supporting arcuate member 104. A suitable fastener such as bolt 120 and nut 122 can be employed to interconnect the two arcuate members, thus securing the cross beam in its horizontal position to the vertical support member 16. If desired, the apertures through the channel beam 42 and through the mating arcuate member 114 can be pre-drilled, leaving only an aperture 126 in the arcuate supporting member 104 to be drilled during construction. At this time, a suitable nut 124 can also be secured to threads on the outer ends of the bolts 108 to more securely fix the position of the cross beam 20 relative to the vertical support members 16.

One of ordinary skill after reading the foregoing description of the interconnecting assembly will realize that the assembly provides for five degress of positioning freedom of the cross member 20 relative to the vertical support member 16. Firstly, if the sleeves 100 were secured to the vertical support members 116 prior to positioning of the cross beam 20, misalignment between the cross beam and the vertical support members could very well occur. Instead, the sleeve 100 of the present invention is freely rotatable about the vertical support member 16 so that exact alignment can be achieved between the supporting arcuate members 104 and 114. Additionally, if the vertical support members are not at their nominal spacing but are within the allowed tolerances, the length of the arcuate support surfaces 104 and 114 allows the position of the cross member 20 to be adjusted in the direction of its longitudinal dimension to center the cross member between the vertical support members. Additionally, the cross member can be rotated about the longitudinal axes of the arcuate members 104 and 114 to position the upper surface of the channel beam 42 horizontally as is preferred for its shoe supporting function. Only thereafter is the fastening aperture 126 bored through the supporting arcuate member 104 to affix the cross beam in its proper horizontal orientation. Moreover, a fourth adjustment can be made in the interconnecting assembly 34 in that the sleeves 100 are height adjustable and fixable at a predetermined elevation on the vertical support members 16 so that the upper surface of the channel beam 42 can be located at its nominal height. Also the layer 118 of resilient material can compensate for non parallel alignment between the arcuate members 104 and 114.

Referring now to FIGS. 5 and 13, an energy absorbing bumper is mounted on one or more of the vertical support members 16 at the approximate nominal elevation of the pipeline 10. The bumper 130 in its preferred form is a right rectangular polyhedron having its longitudinal axis oriented vertically. A longitudinally extending, cylindrical bore 132 extends from the bottom to the top of the bumper. The attachment fixture for connecting the bumper 130 to the vertical support member 16 includes an external sleeve 136 mounted for vertical sliding movement on the vertical support member 16. A pair of retaining bars 138 are positioned on opposite sides of the vertical support member 16 abutting the bottom surface of the sleeve 136. The retaining bars 138 are welded to the vertical support member at a predetermined location to position the sleeve at its appropriate height, namely so that the center portion of the sleeve is at the nominal elevation of the pipeline 10. A pair of radially extending, cylindrically shaped arms 140 are affixed to and extend outwardly from the sleeve 136 to a location between the pipeline 10 and the vertical support member 16 where they are attached to the web of a vertically oriented I beam 142. A rod 144 having a longitudinal dimension greater than the longitudinal dimension of the bumper is positioned within the bore 132 so that it abuts the surface of the bore closest to the web of the I beam 142. Spaced, horizontal bores are provided in the bumper running from the vertical bore 134 to the surface of the bumper 130 abutting the web of the I beam 142. Mutually aligned bores are also provided in the web of the I beam 142. A plurality of U bolts 146, only one of which is shown in FIG. 13, are inserted through the horizontal bores in the bumper and I beam so that the U portion of the U bolts surround the rod 144 positioned in the vertical bore 132. Suitable nuts are then threaded onto the ends of the U bolts 146 to pull the rod 144 toward the web of the I beam, thus pulling the bumper toward and securing it to the web of the I beam 142. Retaining plates 148 having central bores are inserted over the ends of the vertical bar 142 in abutting relationship with the top and bottom of the bumper 130. The ends of the bar 142 are threaded to receive nuts that mutually fasten the bar in place to prevent it from dropping out of the bore 134 should the U bolts become loosened for any reason.

A second bumper 150 is attached to the flanges 24c and 26c adjacent the mounting location of the bumper 130 mounted on one of the vertical support members. The second bumper 150 is oriented parallel to the pipeline and is affixed to the flanges 24c and 26c by angle brackets. The horizontal flanges of the angle brackets have bores that are engaged by the clamp fasteners 74 while screws extend through the vertical flanges of the angle brackets to secure the second bumper beam to the brackets.

In the preferred embodiment, the vertical support member mounted bumper 130 is composed of rubber. The second bumper 150 is preferably composed of wood. The purpose of the bumper 130 is to prevent the pipeline 10 from contacting the vertical support members 16 upon occurrence of a major seismic disturbance or other disturbance that would cause the pipeline 10 to move a greater distance along the cross member 20 than it normally would move under the influence of normal expansion and contraction. Should the wooden bumper 150, which is fastened to the pipeline 10, abut the surface of the bumper 130 closest thereto, the rubber bumper 130 will absorb the kinetic energy of the moving pipeline without harm. If the kinetic energy of the pipeline is sufficiently great, the wooden bumper 150 will crush while absorbing additional energy. In this manner, the vertical support member and in fact the entire intermediate sliding support assembly is protected from damage upon large relative displacements of the pipeline 10.

The present invention has been described in relation to a preferred embodiment. One of ordinary skill in the art of pipeline construction will, after reading the foregoing specification, be able to make various alterations, substitutions of equivalents and other changes without departing from the scope and intent of the disclosed invention. It is intended therefore, that the scope of protection granted by Letters Patent hereon be limited only by the definitions contained in the appended claims and equivalents thereof.

What is claimed is:

1. A sliding support for an aboveground pipelne, said pipeline traversing a relatively straight path at the location of said sliding support, comprising in combination:
   a supporting cross member and means for mounting said cross member above the ground and in stationary relationship thereto, said cross member having a generally horizontal upper surface and being positioned under the path of said pipeline,
   a sliding shoe including a base member having a bottom surface, the bottom surface of said base member being oriented in substantially parallel relationship to the upper surface of said cross member and being mounted on the upper surface of said cross member for sliding movement in a direction along the path of the pipeline and in a direction transversely to the path of the pipeline,
   at least one upright member affixed to said base member and extending upwardly therefrom,
   a bar associated with said upright member for movement in a generally upward and downward direction relative to the bottom surface of said base member, said bar having an upper end extending above the upper end of said upright member, and means for connecting the upper end of said bar to said pipeline,
   means associated with said bar and said upright member for preventing lateral movement of said bar relative to said upright member, and
   adjustable stop means associated with said bar and said upright member for fixing the vertical position of said bar relative to said upright member so that said bar cannot move downwardly, to thereby support the weight of said pipeline on said shoe, said stop means and said bar being so constructed and associated with said upright member as to be freely movable upwardly relative to said shoe, thereby allowing said shoe to freely fall from said bar if said shoe and said cross member become relatively displaced.

2. The shoe support of claim 1 wherein said means for connecting the upper end of said bar to said pipeline includes means for thermally insulating said pipeline from said upright member, said sliding shoe, and said supporting cross member.

3. A sliding support for an aboveground pipeline, said pipeline traversing a relatively straight path at the location of said sliding support, comprising in combination:
   a supporting cross member and means for mounting said cross member above the ground and in stationary relationship thereto, said cross member having a generally horizontal upper surface and being positioned under the path of said pipeline,
   a sliding shoe including a base member having a bottom surface, the bottom surface of said base member being oriented in substantially parallel relationship to the upper surface of said cross member and being mounted on the upper surface of said cross member for sliding movement substantially in a direction along the path of the pipeline and in a direction transversely to the path of the pipeline,
   at least one tubular member affixed to and extending upwardly from the base member of said sliding shoe and having an upper end,
   a bar mounted for upward and downward reciprocating movement in said tubular member, the upper end of said bar extending above said tubular member and having means thereon for affixing said bar to said pipeline, a portion of said bar being circumferentially threaded, said bar being so associated with said tubular member to allow said tubular member and said shoe to drop away from said bar when said shoe and said cross member become relatively displaced, and
   a nut threaded onto the threaded portion of said bar, said nut engaging the upper end of said tubular member to prevent downward movement of said bar relative to said tubular member, said bar and said tubular member being freely movable in mutually opposing directions, said nut being rotatable on the threaded lower portion of said bar to adjust the relative height of said bar and said tubular member.

4. The sliding support of claim 3 wherein said tubular member is rectangular in cross section.

5. A sliding shoe for use in a sliding support assembly for an aboveground pipeline comprising:

a base member having a bottom surface, the bottom surface of said base member being orientable relative to the path of a pipeline in a substantially horizontal plane and capable of sliding movement on a support therefor in a direction generally along the path of the pipeline and in a direction transverse thereto, at least one tubular member affixed to and extending upwardly from said base member and having an upper end, a bar mounted for upward and downward reciprocating movement in said tubular member, the upper end of said bar extending above said tubular member and having means thereon for affixing said bar to a pipeline, the lower portion of said bar being threaded, said bar being so associated with said tubular member to allow said tubular member and said base member to drop away from said bar when said base member is displaced from a support therefor, and a nut threaded onto the lower portion of said bar, said nut engaging the upper end of said tubular member to prevent downward movement of said bar relative to said tubular member, said bar and said tubular member being freely movable in mutually opposing directions, said nut being rotatable on the threaded lower portion of said bar to adjust the relative height of the upper ends of said bar and said tubular member.

6. A sliding support for an aboveground pipeline, said pipeline traversing a relatively straight path at the location of said sliding support, comprising in combination:

(a) a supporting cross member and means for mounting said cross member above the ground and in stationary relationship thereto, said cross member having a generally horizontal upper surface and being positioned under the path of said pipeline, (b) a sliding shoe including a base member having a bottom surface, the bottom surface of said base member being oriented in substantially parallel relationship to the upper surface of said cross member and being mounted on the upper surface of said cross member for sliding movement substantially in a direction along the path of the pipeline and in a direction transverse to the path of the pipeline, (c) at least one upright member affixed to said base member and extending upwardly therefrom, (d) a bar associated with said upright member for movement in a generally upward and downward direction relative to the bottom surface of said base member, said bar having an upper end extending above the upper end of said upright member, (e) clamp means capable of being connected to said pipeline for providing an adjustable location on said pipeline to which said bar can be connected, (f) a yoke affixed to one of said clamp means and the upper end of said bar, (g) a flange affixed to the other of said clamp means and said bar, one of said flange and said yokes having an aperture therein, said aperture having an axis oriented substantially horizontally and transversely to the path of said pipeline, (h) sleeve means composed of a thermal insulating material mounted in said aperture, (i) means for connecting the other of said flange and said yoke to said sleeve means, thereby thermally isolating said sliding shoe from said pipeline, (j) means associated with said bar and said upright member for preventing lateral movement of said bar relative to said upright member, and (k) adjustable stop means associated with said bar and said upright member for fixing the vertical position of said bar relative to said upright member so that said bar cannot move downwardly, to thereby support the weight of said pipeline on said shoe, and so that said bar can move freely upwardly relative to said shoe, to thereby allow said shoe to freely fall from said bar if said shoe and said cross member become relatively displaced.

7. The sliding support of claim 6 wherein said flange and said yoke have mutually alignable bores therein, one of said bores being larger than the other of said bores, wherein said sleeve means is cylindrically shaped and adapted for insertion into the larger of said bores in said flange and yoke, said sleeve means having a bore therein oriented for mutual alignment with the other of said bores in said flange and yoke, said means for connecting the other of said flange and said yoke comprising a rod insertable into the bore in said sleeve means and the other of said bores in said flange and yoke to pivotally interconnect said sliding shoe with said clamp means.

* * * * *